(12) United States Patent
Rice (10) Patent No.: US 8,572,255 B2
(45) Date of Patent: Oct. 29, 2013

(54) SYSTEM AND METHOD FOR REESTABLISHING, WITH A CLIENT DEVICE, A SIGNALING SESSION ASSOCIATED WITH A CALL IN PROGRESS

(75) Inventor: Robert M. Rice, Carrollton, TX (US)

(73) Assignee: BroadSoft M6, LLC, Gaithersburg, MD (US)

( * ) Notice: Subject to any disclaimer, the term of this patent is extended or adjusted under 35 U.S.C. 154(b) by 191 days.

(21) Appl. No.: 12/023,702

(22) Filed: Jan. 31, 2008
(Under 37 CFR 1.47)

(65) Prior Publication Data

US 2009/0031029 A1 Jan. 29, 2009

Related U.S. Application Data

(60) Provisional application No. 60/887,525, filed on Jan. 31, 2007.

(51) Int. Cl.
 *G06F 15/16* (2006.01)
 *G01R 31/08* (2006.01)
 *H04W 4/00* (2009.01)
 *H04L 12/28* (2006.01)

(52) U.S. Cl.
USPC ............ 709/227; 370/235; 370/338; 370/401

(58) Field of Classification Search
USPC .......................................................... 709/227
See application file for complete search history.

(56) References Cited

U.S. PATENT DOCUMENTS

| 5,946,634 | A | * | 8/1999 | Korpela .................... 455/552.1 |
| 7,184,418 | B1 | * | 2/2007 | Baba et al. .................... 370/331 |
| 7,835,275 | B1 | * | 11/2010 | Swan et al. .................... 370/229 |
| 2005/0117556 | A1 | | 6/2005 | Lee et al. |
| 2006/0002395 | A1 | | 1/2006 | Araki et al. |
| 2006/0285493 | A1 | | 12/2006 | Manuja et al. |
| 2007/0064673 | A1 | * | 3/2007 | Bhandaru et al. ............. 370/351 |
| 2007/0133803 | A1 | * | 6/2007 | Saito et al. .................... 380/267 |
| 2008/0019370 | A1 | * | 1/2008 | Riley ............................ 370/392 |
| 2008/0089308 | A1 | * | 4/2008 | Jentz et al. .................... 370/342 |
| 2008/0101598 | A1 | * | 5/2008 | Dillaway ........................ 380/44 |

OTHER PUBLICATIONS

Notification of Transmittal of the International Search Report and the Written Opinion of the International Searching Authority, or the Declaration of International Application No. PCT/US08/01278 (Jun. 17, 2008).

(Continued)

*Primary Examiner* — Boris Gorney
(74) *Attorney, Agent, or Firm* — Jenkins, Wilson, Taylor & Hunt, P.A.

(57) ABSTRACT

The subject matter described herein includes methods, systems, and computer readable media for re-establishing, with a client device, a signaling session associated with a call in progress. One method for reestablishing, with a client device, a signaling session associated with a call in progress includes monitoring an Internet protocol (IP) address of media packets received from the client device during a call in progress having an associated signaling session and detecting a change in the IP address for the device from the media packets, and wherein the signaling session is terminated. The method further includes, in response to detecting a change in the IP address for the device from the media packets, sending a notification message to the client device. The method further includes receiving a registration message from the client device to re-establish the signaling session.

18 Claims, 4 Drawing Sheets

(56) References Cited

OTHER PUBLICATIONS

Camarillo et al., "Functionality of Existing Session Border Controller (SBC)," Network Working Group, draft-camarillo-sipping-sbc-funcs-00.txt, p. 1-9 (Feb. 2005).

Schulzrinne et al., "RTP: A Transport Protocol for Real-Time Applications," Network Working Group, RFC 3550 (Jul. 2003).

Rosenberg, et al., "SIP: Session Initiation Protocol," Network Working Group, RFC 3261 (Jun. 2002).

* cited by examiner

| Signaling Session | Source IP | Source Port | Dest IP | Dest Port |
|---|---|---|---|---|
| 1 | Local IP: 197.5.1.1<br>Public IP: 196.1.2.3 | 3009 | Public IP: 197.1.2.3 | 3009 |
| 2 | Local IP: 197.6.1.1<br>Public IP: 197.4.5.6 | 4009 | Public IP: 197.4.5.6 | 4009 |
| 3 | ... | | | |

FIG. 4

SYSTEM AND METHOD FOR REESTABLISHING, WITH A CLIENT DEVICE, A SIGNALING SESSION ASSOCIATED WITH A CALL IN PROGRESS

RELATED APPLICATIONS

This application claims the benefit of U.S. Provisional Patent Application Ser. No. 60/887,525 filed Jan. 31, 2007; the disclosure of which is incorporated herein by reference in its entirety.

TECHNICAL FIELD

The subject matter described herein relates to managing signaling sessions with client devices. More particularly, the subject matter described herein relates to a system and method for reestablishing, with a client device, a signaling session associated with a call in progress.

BACKGROUND

Current and future trends in telecommunications point to a convergence of landline and mobile communications from separate and independent networks into a single IP- (Internet Protocol) based infrastructure that allows seamless migration between the networks as well as service features. The emergence of large-scale WiFi deployment further spurs on the trend to meet the increasing demand for mobility of communications devices.

One issue in networks where Internet protocol is used for calls and signaling sessions associated with calls occurs when a client device, such as a mobile handset, moves from one network to another during a call and the IP address for the device changes. When this occurs, action needs to be taken to maintain the call and re-establish the signaling session with the new IP address in a manner that does not over burden the client device or the network.

Accordingly, in light of these difficulties, there exists a need for methods, systems, and computer readable media for re-establishing, with a client device, a signaling session associated with a call in progress.

SUMMARY

The subject matter described herein includes methods, systems, and computer readable media for re-establishing, with a client device, a signaling session associated with a call in progress. One method for reestablishing, with a client device, a signaling session associated with a call in progress includes monitoring an Internet protocol (IP) address of media packets received from the client device during a call in progress having an associated signaling session and detecting a change in the IP address for the device from the media packets, wherein the signaling session is terminated. The method further includes, in response to detecting a change in the IP address for the device from the media packets, sending a notification message to the client device. The method further includes receiving a registration message from the client device to re-establish the signaling session.

According to another aspect of the subject matter described herein, a system for reestablishing, with a client device a signaling session associated with a call in progress is provided. The system includes the IP node including a module for detecting, by comparing an IP address of a media packet from a media session involving the client device with an IP address stored for a signaling session associated with the media session in the signaling session table, a change in the IP address of the client device. The signaling session is terminated. In response to detecting the change in the IP address, the module is operable to send a notification message to the client device, to receive a registration message from the client device to re-register the signaling session, and, in response to the registration message, to re-establish the signaling session.

According to another aspect, the subject matter described herein includes a computer readable medium having stored thereon a computer program including computer executable instructions that when executed by a processor implement steps. The steps include monitoring an Internet protocol (IP) address of media packets received from the client device during a call in progress having an associated signaling session and detecting a change in the IP address for the device from the media packets, and wherein the signaling session is terminated. The steps further include, in response to detecting a change in the IP address for the device from the media packets, sending a notification message to the client device. The steps further include receiving a registration message from the client device to re-establish the signaling session.

The subject matter described herein can be implemented using a computer readable medium having stored thereon a computer program including executable instructions that when executed by a processor implement steps. Exemplary computer readable media suitable for implementing the subject matter described herein include chip memory devices, disk memory devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The subject matter described herein includes methods, systems, and computer readable media for re-establishing, with a client device, a signaling session associated with a call in progress when the IP address of the client device changes during the call. The scenario that the IP address of a client device would change during a call is occurring more often than before because client devices are becoming more mobile. When a mobile device moves from one network to another, the IP address used for the device changes to a new IP address. One consequence of the changed IP address is that the signaling session established with the original IP address would be terminated due to dropped signaling refreshing messages.

For a voice application, such as VoIP, a signaling session must be maintained with the new IP address, not only to maintain the session but also for providing service features that may be invoked during the call. Thus, it is an important issue to re-establish the signaling session with the new IP address once an IP address changes as the result of client devices moving from one location to another.

Attempts to re-establish a signaling connection by frequent signaling refresh or keep-alive messages can be detrimental to the battery life for these mobile devices. Thus, a requirement is that any solution shall have minimal impact or drain on the power resource of the client device itself, as well as on the server.

One exemplary solution described herein uses RTP (Real Time Transport Protocol) packets from a media path to detect any address change of a client device. Once a change in IP address is detected, the client device is notified to re-establish the signaling session with the new IP address and session port. The term "signaling session" refers to the channel used to exchange call control messages between an IP node and a client device during a call. The signaling channel for a call may be a session initiation protocol (SIP) signaling channel. RTP is described in IETF RFC 3550, the disclosure of which is incorporated herein by reference in its entirety. SIP is described in IETF RFC 3261, the disclosure of which is incorporated herein by reference in its entirety. The present solution minimizes the impact on the client device as well as the server side components like the session border controller (SBC) and application server.

As a client device moves away from its previous location, the IP address associated with a session changes during an active call. Example scenarios of the IP address change include but not limited to the following:

a) A caller using a Wi-Fi phone moves from one building to next across different access points that are served by different router for the same SSID (Service Set Identifier).

b) A caller using a Wi-Fi phone moves from one access point coverage to another where the servicing SSID has changed but the device is authorized to use both networks.

c) The caller using a Wi-Fi phone being served by a mesh network moved to a backup SSID or different access point for redundancy or load sharing.

d) During a long call, the DHCP (Dynamic Host Configuration Protocol) client sends a DHCP refresh and receives a different address than that which the call was started.

Figure 1:
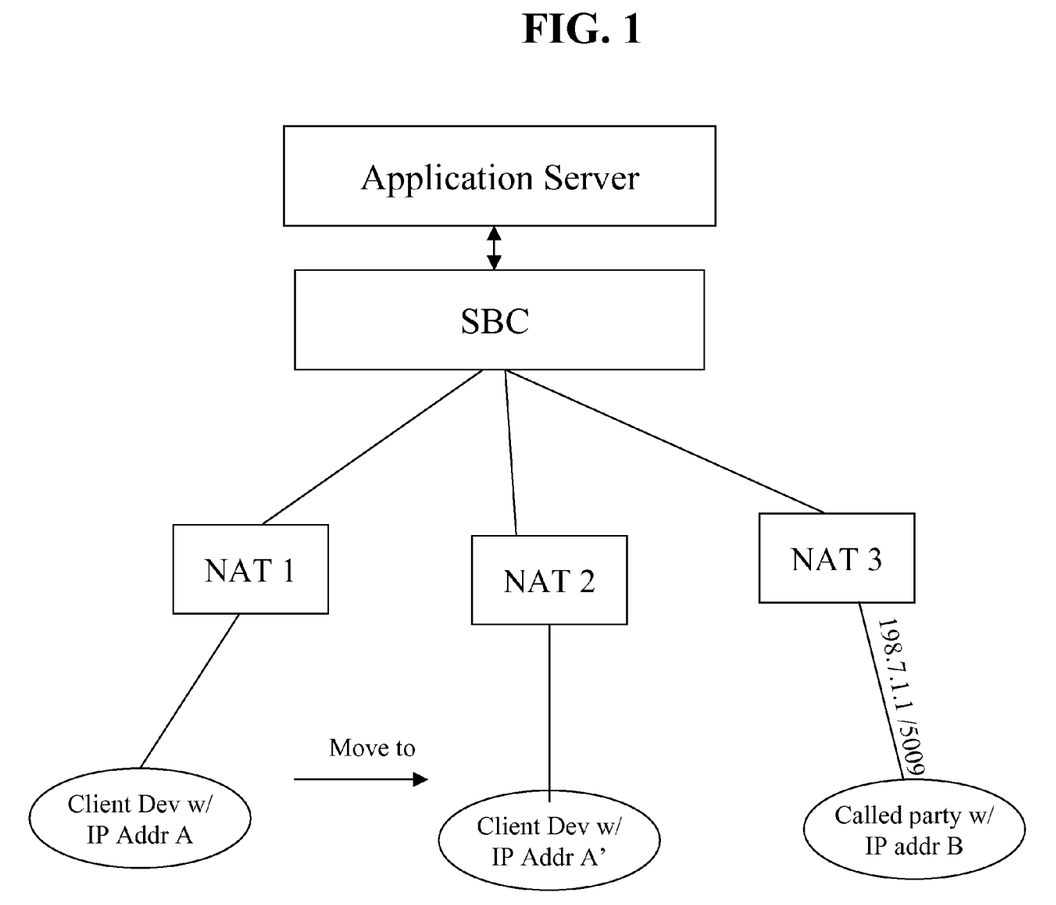
FIG. 1 is a simplified block diagram illustrating a typical scenario where an IP address of a client device changes and in which embodiments associated with the subject matter described herein may be used to re-establish, with a client device, a signaling session associated with a call in progress.

FIG. 1 is a block diagram illustrating a scenario where a client device moves from one NAT (Network Address Translator) to a different NAT.

The scenario d) described above is typical for a stationary client IP device where the IP address associated with the client device changes as a part of protocol operation. The Dynamic Host Configuration Protocol (DHCP) is a set of rules used by an IP communications device (such as a computer, router or networking adapter) to allow the client device to have a dynamically assigned (as opposed fixed) IP address. DHCP is commonly used by a carrier to assign an IP address on need basis to a subscriber's device as a device starts a new session (e.g., a subscriber gets online). To share a pool of IP addresses among a large number of subscribers and also to prevent a client device from operating as a server, the IP address initially assigned to the client device is changed and re-assigned at a configurable, fixed interval. For data applications like web browsing, this has no impact because the change to the dynamically-assigned IP addressed during a session is transparent to the application associated with the session, since only the data path is required for such application. However, for voice applications like VoIP, there is a signaling session on top of the data session, and the IP address change will impact the signaling session as described above.

Referring again to FIG. 1, the signaling path established between the SBC and the previous NAT device, i.e., NAT 1 in FIG. 1, became invalid once the mobile device moves away from the domain of NAT1. The SBC keeps the old session with the previous NAT1 IP address. When the SBC attempts to refresh the session, session timer would time out and causes the media path for the session to be terminated by the SBC or the serving application server.

Figure 2:
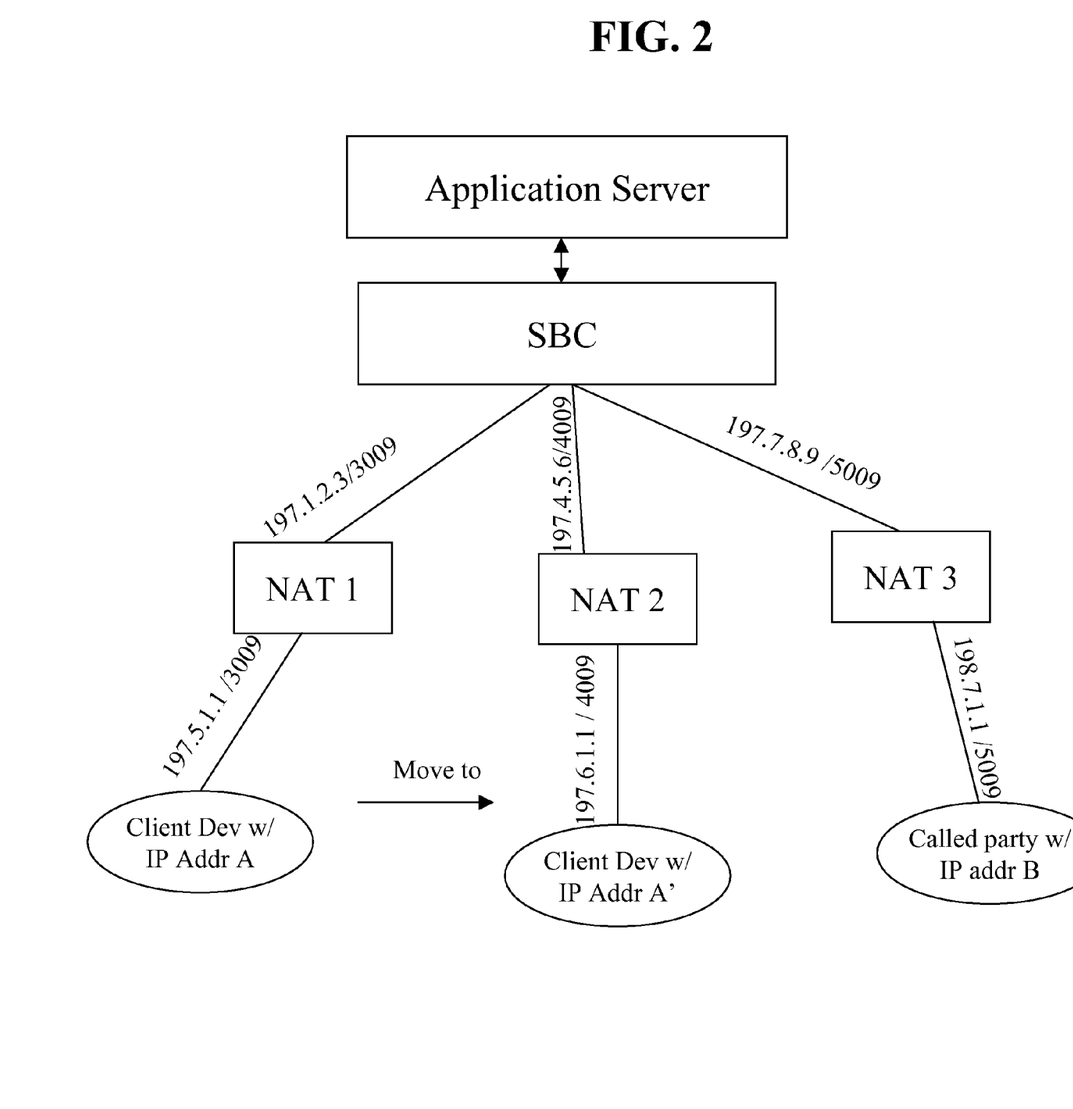
FIG. 2 is a more detailed block diagram illustrating a typical scenario where an IP address of a client device changes and in which embodiments of the subject matter described herein may be used to re-establish a signaling session with the client device associated with a call in progress.

FIG. 2 is a more detailed block diagram. As shown in FIG. 2, when the client device with IP address A establishes a session with an application server, as part of call setup, the application server establish two separate paths:

a) Establish a media path between the client device and SBC/application via a NAT (NAT 1 in this case).

b) Establish a signaling path between the client device and SBC/application via a NAT (NAT 1 in this case).

The media path and the signaling path share the same IP address but use different UDP (User Datagram Protocol) ports. The media path carries media packets, such as voice packets, during the call. The signaling path carries signaling messages, such as call control signaling messages, during the call. In one example, as described above, the media path may be an RTP media path and the signaling path may be a signaling path used to carry SIP messages.

In an enterprise network, an IP client device is normally hidden behind a firewall and the IP address is dynamically assigned on a per-session basis. A NAT device at the border of an enterprise network is responsible for mapping the dynamic IP address to a static, publicly visible IP address. The dynamically-assigned IP address is also called the local IP address and the NAT assigned static IP address is also called the public IP address in this disclosure. In the example show in FIG. 2, the private IP address is 197.5.1.1 and the public IP address is 197.1.2.3. The function of a SBC is to hide the network topology by mapping the public IP address to a private IP address known only to an associated application server.

In case of a client device moving within the domain of the same NAT, as long as the client IP device's public IP address remains the same, there is not an issue of invalid signaling session for the mobile device, because the SBC/application server can still reach the device via the same NAT.

Each media session between a client device and an SBC via a NAT is established as part of a call setup. The media packet header (RTP header) includes the following information: source IP address, source UDP port; destination IP address, and destination UDP port. The source local IP address is the local IP address as shown in FIG. 2 while the destination IP address is the public visible IP address assigned by the NAT associated with the called party, i.e., NAT3 in this case. Using the example in FIG. 2, the client device with IP address A has the following address pairs in its media packets: (source: 197.5.1.1, 3009; Destination: 197.7.8.9, 5009). The NAT device NAT1 maps the source IP address as the following: (source: 197.1.2.3, 3009; Destination: 197.7.8.9, 5009).

Figure 3:
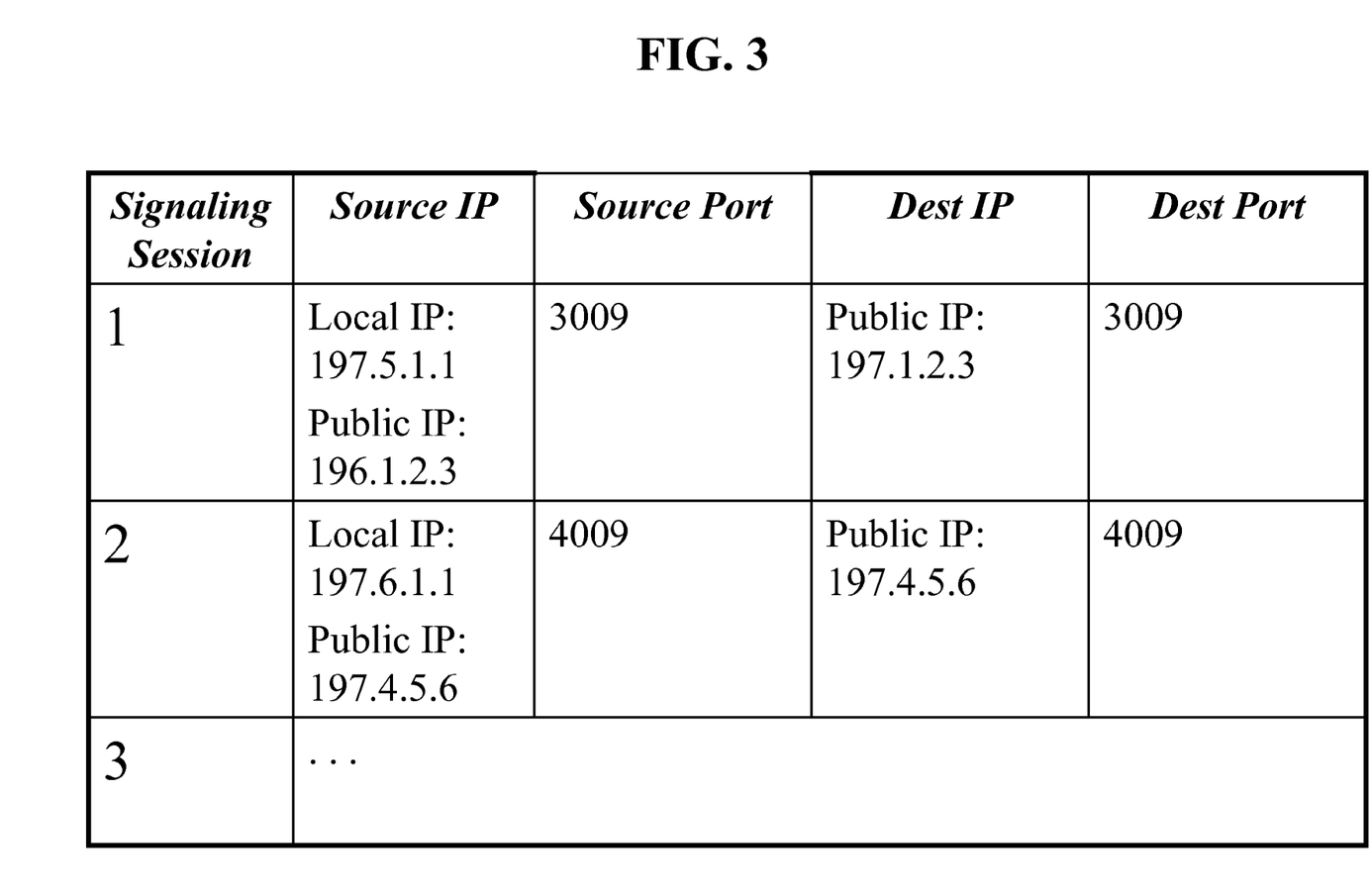
FIG. 3 is an exemplary signaling session table usable by embodiments of the subject matter described herein to track the IP address associated with a client device during a call in progress.

Similar to the media session/path, a signaling session/path is established as part of a call setup. At the SBC, a table is maintained for all signaling sessions as shown in FIG. 3. For each signaling session, a pair of local IP address and UDP port and a pair of public IP address and UDP port are maintained. It is the pair of public IP and UPD port in the table that will be updated once the IP address change is detected, as described below. The table may be used by a module, such as a hardware, software, and/or firmware module, in the SBC to detect a change in the IP address associated with a client device.

As the client device moves from one IP address to a different one served by a different NAT device while a call is in progress, the media path is maintained since the device keeps sending the media packets to the destination device. The IP address change detection works as follows: the SBC continues receiving RTP packets from the media path after the devices moves to a new NAT domain. The SBC monitors the source IP address field from the RTP packets and compares the IP address against the source IP address of the previous RTP packet. If a change is detected, it is reported to the module in the SBC responsible for managing the IP address change and initiating the steps described below to re-establish a signaling session. The module in the SBC for initiating the steps for re-establishing the signaling session may be same module or a different module from the module that detects the change in the IP address associated with a client device. Accordingly, the term "module" as used herein refers to one or more hardware, software, and/or firmware components that perform the steps described herein for detecting the change in the IP address and re-establishing or initiating reestablishment of the signaling session.

The module in the SBC may implement the following steps for detecting a change in an IP address for a client device during a call in progress:
  Step 1: extract and store IP address upon receiving a first RTP packet
  Step 2: Extract IP address upon receiving second RTP packet of the same session
  Step 3: compare the IP address of the first packet against that of the second RTP packet. If same, no action;
  Step 4: If two IP addresses are different, update the public IP address field as shown in FIG. 3 with the new IP address and initiate the signaling session re-establishing process.

An example here will help illustrate the above steps. For the example shown in FIG. 2, the SBC first extracts the following source IP address/port information from the media packet and stores the information in a local data table:
  Local source IP: 197.5.1.1; Local source port: 3009
  Public source IP: 197.1.2.3; Public source port: 3009
  Destination IP: 197.7.8.9; Destination port: 5009

Thereafter, the client device moves and the IP address changes from A to A'. The client device continues sending the media packets to the SBC/application server this time via NAT2. The SBC extracts the following source IP address field in the RTP header and updates the signaling session data table:
  Local IP: 197.6.1.1.1; Local port: 4009
  Public source IP: 197.4.5.6; Public source port: 4009
  Destination IP: 197.7.8.9; Destination port: 5009

The SBC makes a comparison of the source IP address of this packet to that of the previous packet and determines that IP addresses has changed and thus initiates the signaling session re-registration process as described below.

Figure 4:
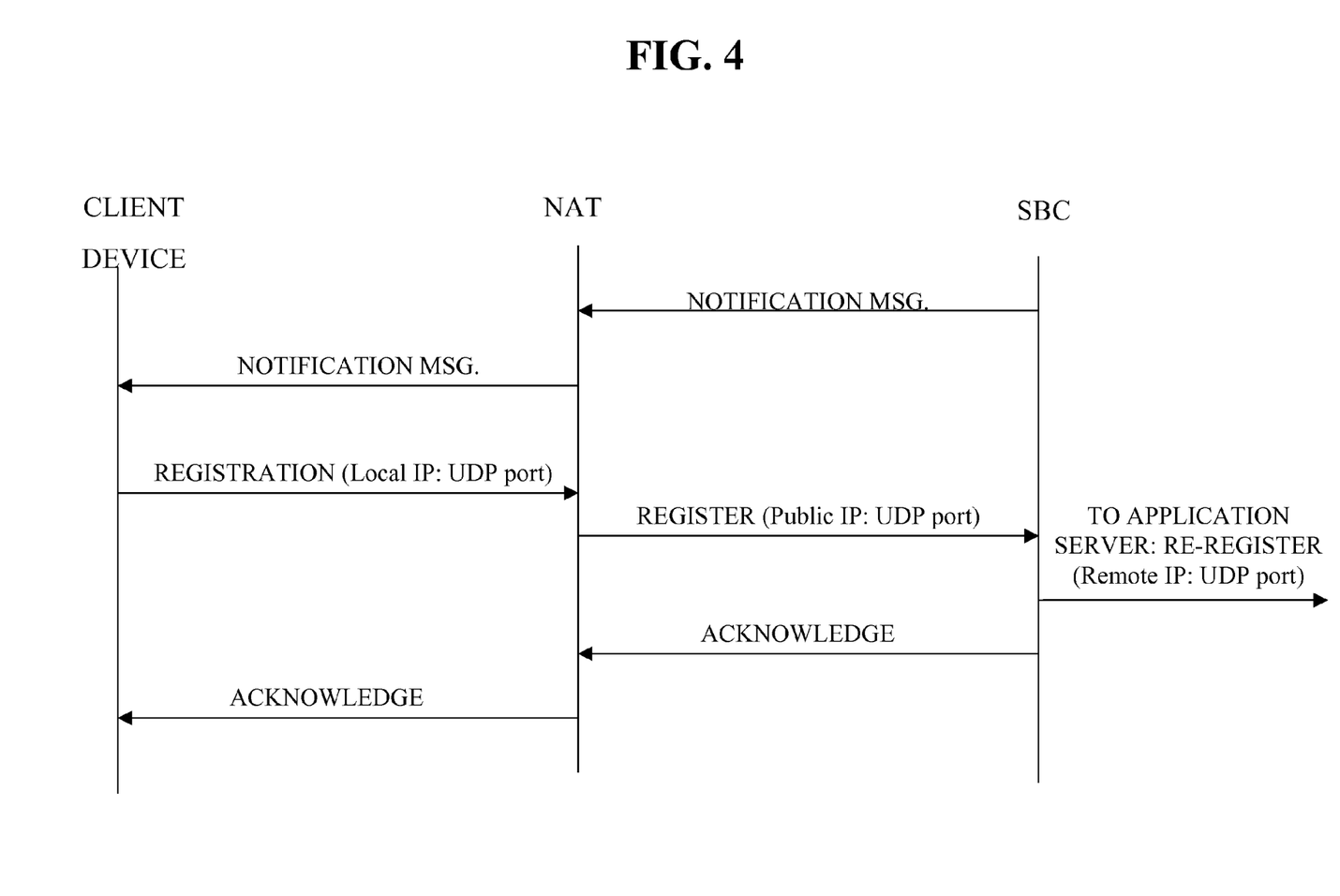
FIG. 4 is an exemplary data flow diagram illustrating exemplary messages that to re-establish signaling session with a client device upon an IP address change according to an embodiment of the subject matter described herein.

There are several options for the mechanisms that may be used to re-establish a signaling session between the client device from a new IP address and the SBC. One embodiment is to use the SIP (Session Initiation Protocol) registration mechanism. As shown in FIG. 4, the high-level steps that may be implemented by the module in the SBC for re-establishing signaling session include the following:
  Step 1: SBC sends a message to the involved client device via the media path to notify the device to re-establish the signaling session due to the IP address change. There are several choices of the notification message and one of them is a SIP Topology Change notification message.
  Step 2: The involved device sends a message to re-establish signaling session. There are a number of message options that may be used for achieving the purpose of re-establishing signaling session. One of the options is SIP registration message. Included in the SIP registration message are the new IP address and port information associated with the new signaling session and the address information in SIP header include the following: Local IP: 197.6.1.1.1; Local port: 4009; Public source IP: 197.4.5.6; Public source port: 4009; Destination IP: 197.7.8.9; Destination port: 5009.
  Step 3: Upon re-establishing the signaling session, the SBC updates its signaling session table with the new session information and sends back an acknowledgement message.

For the purpose of handling the IP address oscillation and guard against potential fraud, a policy of limiting the number of address changes allowed within a specified period may be implemented. For example, a limit may be set to allow no more than ten IP address changes within ten minutes.

In general, the overall steps include following:
  Step 1: monitoring packets on a media path at a SBC, check IP address in each packet & detect any IP address change.
  Step 2: Upon detecting an IP address change, the SBC sends a message (a specific media type) to the involved client device to request that the device re-register the signaling session.
  Step 3: The client device sends a registration message to re-register the signaling session.
  Step 4: The SBC, upon receiving the registration message, updates its signaling session table and other data as needed and sends back a response message to the client device.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for re-establishing, with a client device, a signaling session associated with a call in progress, comprising:
   at a session border controller (SBC) separate from the client device:
   monitoring, by the SBC, Internet protocol (IP) addresses of media packets received from the client device during a call in progress having an associated signaling session and detecting, by the SBC, a change in the IP address for the client device from the media packets, wherein the signaling session is terminated, wherein monitoring the IP addresses comprises:
   receiving a first real time transport protocol (RTP) packet;
   extracting and storing the IP address of the first RTP packet;
   receiving a second RTP packet from the same media session as the first RTP packet;
   extracting the IP address from the second RTP packet; and
   comparing the IP address stored for first packet with the IP address extracted from the second RTP packet;
   in response to detecting a change in the IP address for the client device from the media packets, sending a notification message from the SBC to the client device, wherein the notification message notifies the client device associated with the changed IP address to re-establish the signaling session;
   receiving a registration message from the client device to re-establish the signaling session; and
   re-establishing the signaling session for the call in progress.

2. The method of claim 1, wherein receiving a registration message comprises receiving a session initiation protocol (SIP) registration message.

3. The method of claim 1, wherein receiving a registration message comprises receiving a session initiation protocol (SIP) invite message.

4. The method of claim 1, comprising sending an acknowledgement message to the client device in response to the registration message.

5. The method of claim 1 wherein detecting a change in the IP address of the client device includes detecting a change in the IP address in response to the client device being assigned a new IP address by a network and wherein the method further comprises re-establishing the signaling session with the client device using the new IP address.

6. The method of claim 5 wherein the new IP address is assigned in response to the client device moving into a new network during the call.

7. A system for re-establishing a signaling session with a client device, comprising:
   a processor; and
   a memory,
   wherein the memory stores a signaling session table for storing IP addresses associated with signaling sessions for calls in progress involving client devices;
   wherein the memory stores computer executable instructions that when executed by the processor implement a session border controller (SBC) for communicating with the client device and being separate from the client device;
   the SBC including a module operable to detect, by comparing an IP address of a media packet from a media session involving the client device with an IP address stored for a signaling session associated with the media session in the signaling session table, a change in the IP address of the client device, wherein detecting a change in the IP address of the client device includes monitoring IP addresses comprising:
   receiving a first real time transport protocol (RTP) packet;
   extracting and storing the IP address of the first RTP packet;
   receiving a second RTP packet from the same media session as the first RTP packet;
   extracting the IP address from the second RTP packet; and
   comparing the IP address stored for first packet with the IP address extracted from the second RTP packet; and
   wherein the signaling session is terminated, and, in response to detecting the change in the IP address, the module is operable to send a notification message from the SBC to the client device, wherein the notification message notifies the client device associated with the changed IP address to re-establish the signaling session, to receive a registration message from the client device to re-register the signaling session, and, in response to the registration message, to re-establish the signaling session.

8. The system of claim 7, the SBC is coupled between a server and a network address translator.

9. The system of claim 7, wherein the media session comprises a real time transport protocol (RTP) media session and wherein the signaling session comprises a session initiation protocol (SIP) signaling session.

10. The system of claim 7, wherein the module is configured to analyze successive media packets received for the media session to detect the change in the IP address.

11. The system of claim 7, wherein the change in the IP address occurs in response to the client device being assigned a new IP address and wherein the module is configured to re-establish the signaling session using the new IP address.

12. The system of claim 11 wherein the new IP address is assigned in response to the client device moving into a new network during the call.

13. A non-transitory computer readable medium having stored thereon having stored thereon instructions, that when executed by a processor implement steps comprising:
   at a session border controller (SBC) separate from the client device:
   monitoring, by the SBC, Internet protocol (IP) addresses of media packets received from the client device during a call in progress having an associated signaling session and detecting, by the SBC, a change in the IP address for the client device from the media packets, wherein the signaling session is terminated, wherein monitoring the IP addresses comprises:
   receiving a first real time transport protocol (RTP) packet;
   extracting and storing the IP address of the first RTP packet;
   receiving a second RTP packet from the same media session as the first RTP packet;
   extracting the IP address from the second RTP packet; and
   comparing the IP address stored for first packet with the IP address extracted from the second RTP packet;
   in response to detecting a change in the IP address for the client device from the media packets, sending a notification message from the SBC to the client device, wherein the notification message notifies the client device associated with the changed IP address to re-establish the signaling session;

receiving a registration message from the client device to re-establish the signaling session; and re-establishing the signaling session for the call in progress.

14. The non-transitory computer readable medium of claim 13, wherein receiving a registration message comprises receiving a session initiation protocol (SIP) registration message.

15. The non-transitory computer readable medium of claim 13, wherein receiving a registration message comprises receiving a session initiation protocol (SIP) invite message.

16. The non-transitory computer readable medium of claim 13, comprising sending an acknowledgement message to the client device in response to the registration message.

17. The non-transitory computer readable medium of claim 13, wherein detecting a change in the IP address of the client device includes detecting a change in the IP address in response to the client device being assigned a new IP address by a network and wherein the method further comprises re-establishing the signaling session with the client device using the new IP address.

18. The non-transitory computer readable medium of claim 17, wherein the new IP address is assigned in response to the client device moving into a new network during the call.

* * * * *